(12) United States Patent
Hinek et al.

(10) Patent No.: US 11,494,933 B2
(45) Date of Patent: Nov. 8, 2022

(54) OCCLUDED ITEM DETECTION FOR VISION-BASED SELF-CHECKOUTS

(71) Applicant: NCR Corporation, Atlanta, GA (US)

(72) Inventors: Frank Douglas Hinek, Decatur, GA (US); Qian Yang, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 203 days.

(21) Appl. No.: 16/917,370

(22) Filed: Jun. 30, 2020

(65) Prior Publication Data

US 2021/0407124 A1    Dec. 30, 2021

(51) Int. Cl.
| | |
|---|---|
| *G06T 7/73* | (2017.01) |
| *G06T 7/194* | (2017.01) |
| *G06N 20/00* | (2019.01) |
| *G06V 10/44* | (2022.01) |
| *A47F 9/04* | (2006.01) |
| *G06Q 20/14* | (2012.01) |
| *G06Q 20/18* | (2012.01) |

(52) U.S. Cl.
CPC .............. *G06T 7/73* (2017.01); *A47F 9/046* (2013.01); *G06N 20/00* (2019.01); *G06Q 20/14* (2013.01); *G06Q 20/18* (2013.01); *G06T 7/194* (2017.01); *G06V 10/44* (2022.01); *G06T 2207/20081* (2013.01); *G06T 2207/20132* (2013.01); *G06T 2210/12* (2013.01)

(58) Field of Classification Search
CPC ... G06T 7/10; G06T 7/11; G06T 7/194; G06T 7/70; G06T 7/73; G06T 2207/20081; G06T 2207/20132; G06T 2207/30242; G06K 9/00; G06V 10/25; G06V 10/44; G06V 20/52; G06V 20/53; G06V 20/54; G06V 20/64; G06V 20/647; G06V 20/653; G06V 20/68; G06V 30/147; G06V 30/1801; G06V 30/182; G06V 30/1823; G06V 30/1826; G06V 30/1829; G06V 30/1831; G06V 30/1834; G06V 30/1837; G06Q 20/20; G06Q 20/206; G06Q 20/208

See application file for complete search history.

(56) References Cited

U.S. PATENT DOCUMENTS

| | | |
|---|---|---|
| 2018/0218351 A1 | 8/2018 | Chaubard et al. |
| 2019/0108396 A1* | 4/2019 | Dal Mutto et al. ... G07G 1/0063 |
| 2020/0134339 A1* | 4/2020 | Zucker et al. ......... G06V 40/10 |
| 2021/0089816 A1* | 3/2021 | Amon et al. ........... G06V 10/82 |
| 2021/0279503 A1* | 9/2021 | Qi et al. ................ G06V 10/82 |
| 2021/0407107 A1* | 12/2021 | Lee et al. .............. G06V 10/74 |

OTHER PUBLICATIONS

Anonymous:Cropping (image), Wikipedia, Jun. 27, 2020 (Jun. 27, 2020), pp. 1-3.
Cheong Yun Zhe et al: The Application of Image Processing to Solve Occlusion Issue in Object Tracking, MATEC WEB CONF., [Online] vol. 152, Feb. 26, 2018 (Feb. 26, 2018), pp. 1-10.
EP Search Report, dated Nov. 25, 2021 , 14 pages.

* cited by examiner

*Primary Examiner* — Andrew W Johns
(74) *Attorney, Agent, or Firm* — Schwegman Lundberg & Woessner

(57) ABSTRACT

Item recognition of a given item is trained on a single item from different views. The item recognition is then trained on images of the given item partially occluded by a second item having same, similar, or different shapes and features to that of the given item. General features of the item are noted and used to detect the given item when the given item is presented with multiple different items having multiple different occluded views.

10 Claims, 3 Drawing Sheets

OCCLUDED ITEM DETECTION FOR VISION-BASED SELF-CHECKOUTS

BACKGROUND

Current approaches to item checkout entails placing a single item on a designated shelf for camera capture or scanning a single item's barcode past a scanner. Camera item capture and subsequent item recognition require a substantial amount of training on various images taken of each item from a multitude of different angles. Moreover, during training the images are annotated to ensure proper training and recognition of each item.

Present approaches associated with identifying and recognizing a single item at a time during checkout are inefficient. Customers already select items for purchase individually and during checkout it is time-consuming for the customers or cashiers to again handle each item individually for purposes of identifying each item for checkout.

Some techniques attempt to recognize multiple items during checkout, but such techniques are error prone and of poor accuracy. This is because when multiple items are placed on a checkout counter (which is already a small area), items will partially cover or occlude full views of one another on the counter.

Existing techniques try to solve this problem by attempting to train for item recognition with a plurality of different items all covering one another from different positions and angles. It is infeasible, if not impossible, to train on all the possible combinations that may occur. As a result, these techniques are of poor accuracy and take a long time to implement because of the enormous size of training images required to achieve even a marginal level of acceptable accuracy. Furthermore, the training images require manual annotation, which means that it is a sizable undertaking to even obtain a good quality and sufficient sized training set of images.

SUMMARY

In various embodiments, methods and a system for vison-based detection of multiple items having occluded item views are presented. The PINpad includes an integrated scanner/camera and independent security processing.

According to an embodiment, a method for vison-based detection of multiple items having occluded item views is provided. An image is obtained; the image representing a transaction area comprising multiple items. Features are extracted from the image and bounding boxes are defined within the image based on the features. Each bounding box representing a different item or a different set of items with at least one item in that different set of items being occluded within the corresponding bounding box. The features are processed with the bounding boxes and item identifiers are assigned to each of the multiple items from the image. The item identifiers are provided to a transaction manager during a transaction at a transaction terminal.

DETAILED DESCRIPTION

Figure 1:
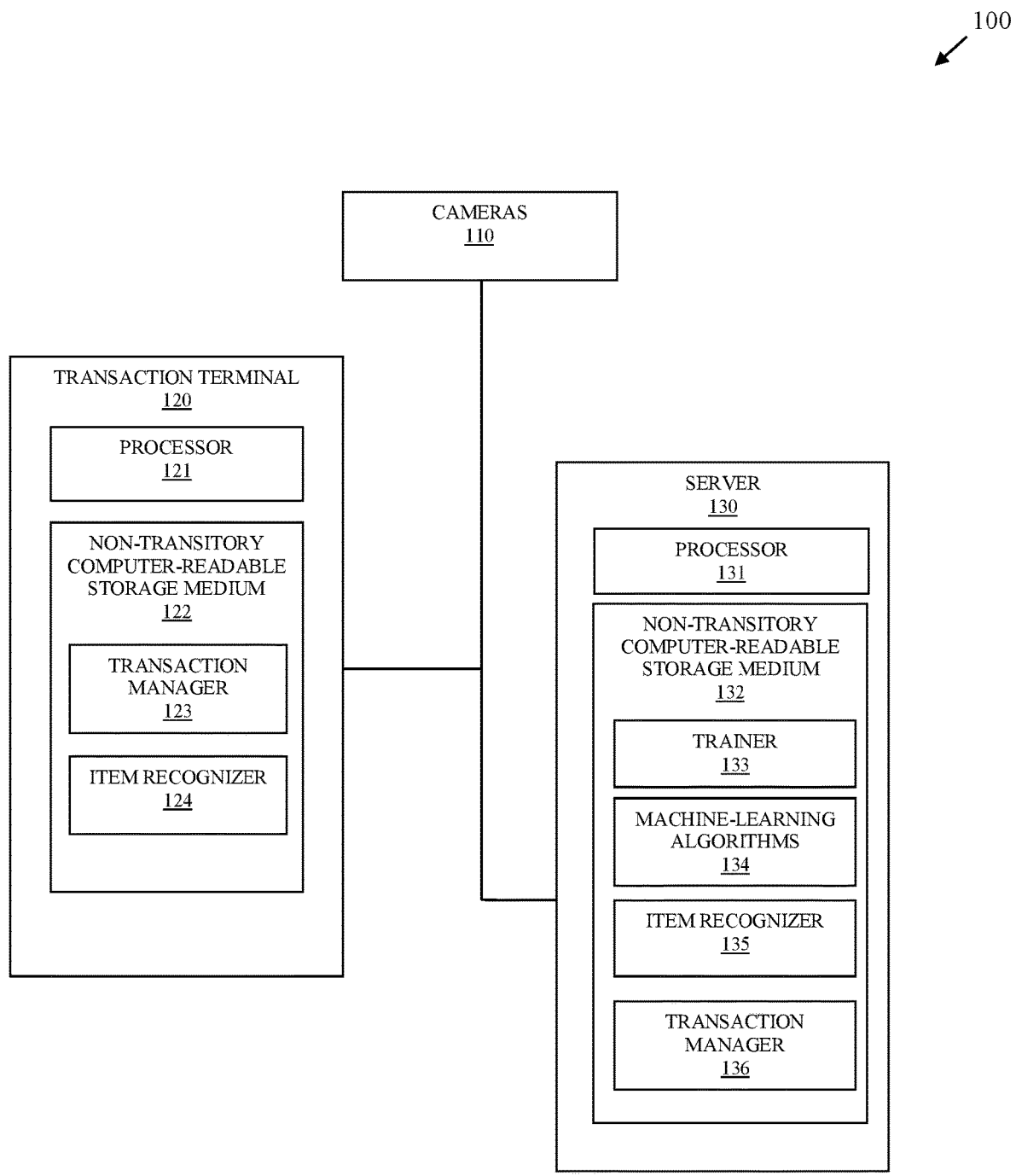
FIG. 1 is a diagram of a system for vison-based detection of multiple items having occluded item views, according to an example embodiment.

FIG. 1 is a diagram of a system 100 for vison-based detection of multiple items having occluded item views, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of vison-based detection of multiple items having occluded item views, presented herein and below.

As will be discussed more completely herein and below, system 100 permits training multiple machine-learning algorithms on a smaller data set than what has been conventionally been achievable for vision-based detection of multiple items during a transaction. A first machine learning algorithm is trained on a given item with the given item oriented toward and away from the camera such that different portions or angles of the given item are visible in the captured images. General features of the given item are extracted and associated with that item. A second machine learning algorithm is trained on different sets of two items (each set including the given item with a different item) and the given item is partially occluded in each set. The different items in the second training are of items with the same, similar, or different shape to that which is associated with the given item. Once both machine-learning algorithms are trained, a vision-based transaction captures an image of a transaction area comprising two or more items with one or more occluded views of each of the items. An item recognizer passes the image to the trained machine-learning algorithms and item identifiers are returned from the items in the transaction area. The item identifiers are provided to a transaction manager and the vision-based transaction is completed without any item scanning and without individually capturing an image of each item of the transaction by itself without the other items of the transaction.

The system 100 comprises cameras 110, a transaction terminal 120, and a server 130.

Transaction terminal 120 comprises a processor 121 and a non-transitory computer-readable storage medium 122 comprising executable instructions representing a transaction manager 122 and an item recognizer 123 (optional depending upon the configuration of system 100). The executable instructions when executed by processor 121 from the non-transitory computer-readable storage medium 122 cause the processor 121 to perform the processing discussed below with respect to transaction manager 122 and item recognizer 123.

Server 130 comprises a processor 131 and a non-transitory computer-readable storage medium 132 comprising executable instructions representing a trainer 133, machine-learning algorithms 134, an item recognizer 135 (optional depending upon the configuration of system 100), and a transaction manager 136. The executable instructions when executed by processor 131 from the non-transitory computer-readable storage medium 132 cause the processor 131 to perform the processing discussed below with respect to trainer 133, machine-learning algorithms 134, item recognizer 135, and transaction manager 136.

Initially, trainer 133 provides a user interface for training a first machine-learning algorithm 134 to recognize an item from a variety of images taken of the item by itself. For example, the training images of the item by itself may include the item with a top-down view taken by camera 110, side views, front view, rear/back view, various angled views, etc. First machine-learning algorithm 134 (hereinafter "machine-learning algorithm" is referred to as "MLA") extracts features for the training images provided as input during a training session, such features include color, dimensions, size, edges, lines, shapes, etc. First MLA 134 is also provided with each training image an expected item identifier from the training item associated with the training image. First MLA 134 configures weights and factors based on the extracted features in the supplied training images, such that when provided a subsequent non-training image of a transaction item during a transaction, MLA 134 returns the item identifier for the transaction item by extracting the item features and assigning the configured and trained weights and factors to arrive at a score, which matches the item identifier. It is noted that the training images are not exhaustive including all potential camera angles and such is not necessary. Moreover, since only a single item is being trained in isolation from any additional items, the training data set and the length of time for training is substantially reduced.

Trainer 133 provides the same or different user interface for training a second MLA 134 with additional training images. Each additional training image comprises an image of two items together in the image. Each item already trained for recognition by the trainer with the first MLA 134 on images that comprised just that item (as discussed above). Each training image shows the two items oriented in different orientations having partial occluded views of both of the items or just one of the two items in that training image. Again, the different orientations and different occlusions present in the training images for the pair of items need not and is not expected to be exhaustive. Second MLA 134 is also provided the corresponding executed item identifiers for each of the items in each training image. Second MLA 134 then extracts features and assigns weights and factors for purposes of automatically predicting item identifiers from the single image, similar to what was discussed above with the first MLA 134.

Item recognizer 135 is trained and configured to identify from a given item of multiple items provided by cameras 110, to detect pixel features for each potential unique item in the image. Item recognizer then crops the single image into a series of images, each image in the series comprises either a single item's features (lines, edges, shape, color, etc.) or two or more items' features with occlusion present for the two or more items.

The cropped images obtained from the single captured image of the transaction area having multiple items are then provided to either first MLA 134 (when just one item is present in that cropped image) or to second MLA 134 (when two or more items are present in that cropped image). First MLA 134 and second MLA 135 return item identifiers for each of the cropped images to item recognizer 135 as output.

Each cropped image represents a bounding box for a given item or a set of items with at least one item having an occluded or obstructed pixels associated with another of the items in the cropped image. The bounding box can be passed as input to the second MLA 134 for item detection when occluded or obstructed pixels are present.

Item recognizer 135 then provides the item identifiers for the single image of the transaction area to transaction manager 136. Transaction manager 136 obtains item details and item pricing for each item identifier and provides the item details and item pricing to transaction manager 123 for presentation on a transaction display of transaction terminal 120.

System 100 performs training on two overlapping items, which enables detection of N (greater than 2 overlapping items) overlapping items by inference. Hence, scalability can be generalized by training on simplified datasets. Also, detecting general features like bounding box (cropped image) from one camera view enables detection from other views. Characteristics like shape, edge, and color from multi-views share common features and can be generalized to each other. In addition, bounding box detection model training on certain items is able to detect items that haven't been seen. For example, a training set that represents edge feature well doesn't need to include all items to be detected. Furthermore, and in an embodiment, by splitting recognition model into detection-classification cascade, only 4,000 images are needed to get decent detection model that can not only detect occluded items but also items haven't been trained based on transfer learning. In an embodiment, after training each item to be classified needs just a few hundred training images to obtain high-accuracy classification from much simpler classifier, which is a significantly higher accuracy than existing recognition models and system 100 requires fewer training images. So, system 100 permits increased accuracy over the existing techniques while at the same time system 100 requires far less training data than existing techniques. Counterintuitively to the teachings in the industry, accuracy improves with less training being required.

In an embodiment, system 100 is configured such that the processing discussed above for item recognizer 135 is performed on terminal 120 by item recognizer 124. In such an embodiment, cropped images for the single captured image may be sent as pixel coordinates to first MLA 134 or second MLA 134, such that multiple images need not be transmitted over a network connection between terminal 120 and server 130; rather, just metadata coordinates are sent, which substantially reduces the bandwidth of the network and correspondingly response times in providing item identifiers by first MLA 134 and second MLA 134.

In an embodiment, system 100 is configured with both item recognizers 123 and 135 that cooperate to obtain item identifiers from first MLA 134 and second MLA 134.

In an embodiment, at least one camera 110 is integrated into terminal 110.

In an embodiment, terminal 110 is a Self-Service Terminal (SST) operated by a customer during a vision-based transaction checkout.

In an embodiment, terminal 110 is a Point-Of-Sale (POS) terminal operated by a cashier to assist a customer with a vision-based transaction checkout.

In an embodiment, server 120 is one of multiple servers that logically cooperate as a cloud processing environment (cloud).

These and other embodiments are now discussed with reference to the FIGS. 1-3.

These embodiments and other embodiments are now discussed with reference to the FIGS. 1-3.

Figure 2:
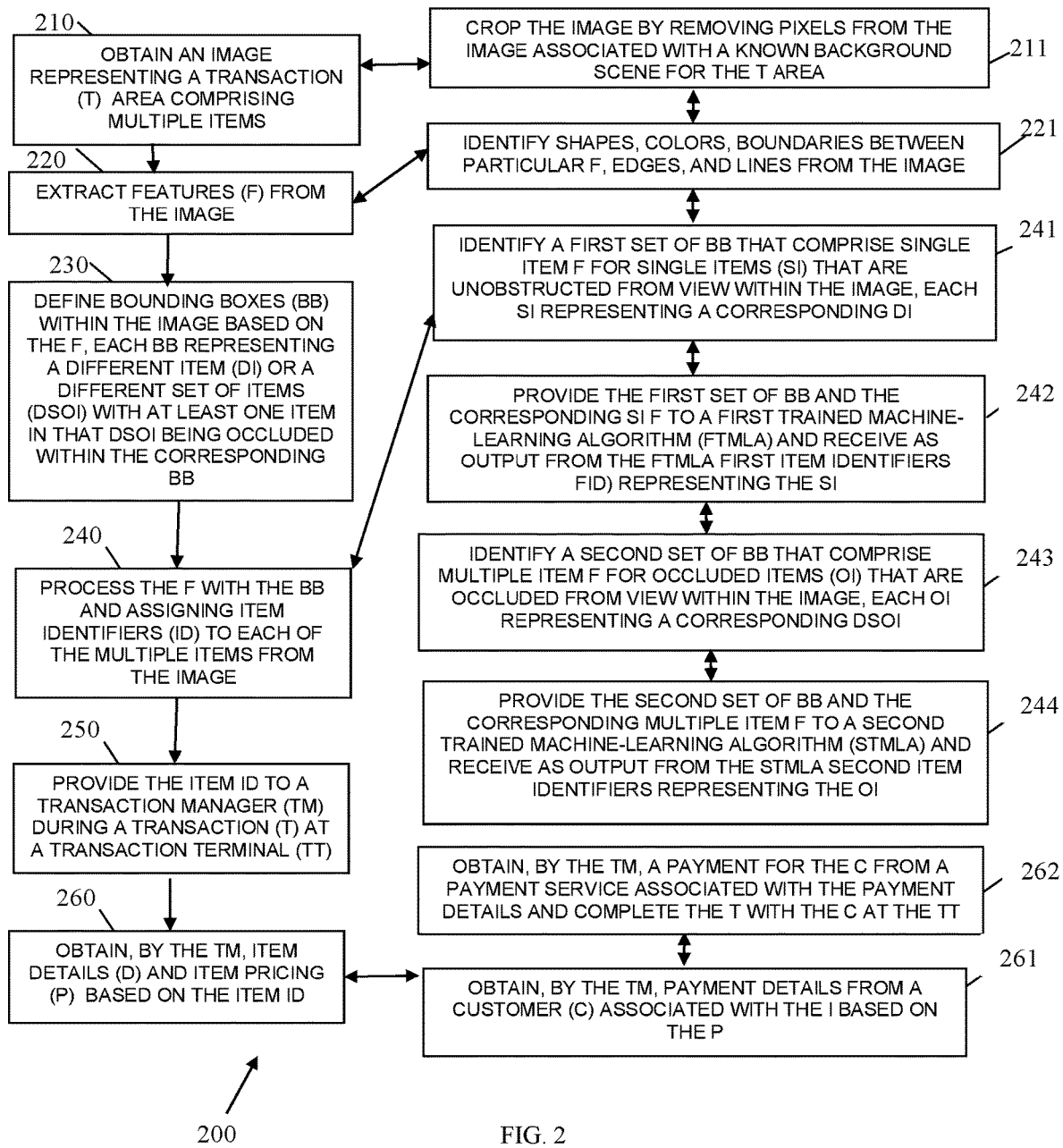
FIG. 2 is a diagram of a method for vison-based detection of multiple items having occluded item views, according to an example embodiment.

FIG. 2 is a diagram of a method 200 for vison-based detection of multiple items having occluded item views, according to an example embodiment. The software module(s) that implements the method 200 is referred to as a "vison-based multiple item identifier." The vison-based multiple item identifier is implemented as executable instructions programmed and residing within memory and/or a non-transitory computer-readable (processor-readable) storage medium and executed by one or more processors of a device. The processor(s) of the device that executes the vison-based multiple item identifier are specifically configured and programmed to process the vison-based multiple item identifier. The vison-based multiple item identifier has access to one or more network connections during its processing. The network connections can be wired, wireless, or a combination of wired and wireless.

In an embodiment, the device that executes the vison-based multiple item identifier is terminal 120. In an embodiment, terminal 120 is a vision-based SST. In an embodiment, terminal 120 is a vision-based POS terminal.

In an embodiment, the device that executes the vison-based multiple item identifier is server 130. In an embodiment, server 130 is one of multiple services that comprise a cloud processing environment (cloud).

In an embodiment, the vison-based multiple item identifier is all or some combination of transaction manager 123, item recognizer 124, MLAs 134, item recognizer 135, and/or transaction manager 136.

At 210, the vison-based multiple item identifier obtains an image representing a transaction area comprising multiple items.

In an embodiment, at 211, the vision-based multiple item identifier crops the image by removing pixels from the image associated with a known background scene for the transaction area.

At 220, the vison-based multiple item identifier extracts features from the image.

In an embodiment of 211 and 220, at 221, the vision-based multiple item identifier identifies shapes, colors, boundaries between particular features, edges, and lines from the image.

At 230, the vison-based multiple item identifier defines bounding boxes within the image based on the features, each bounding box representing a different item or a different set of items with at least one item in that different set of items being occluded within the corresponding bounding box.

At 240, the vison-based multiple item identifier processes the features with the bounding boxes and assigning item identifiers to each of the multiple items from the image.

In an embodiment of 221 and 240, at 241, the vision-based multiple item identifier identifies a first set of bounding boxes that comprise single item features for single items that are unobstructed from view within the image, wherein each single item representing a corresponding different item.

In an embodiment of 241 and at 242, the vision-based multiple item identifier provides the first set of bounding boxes and the corresponding single item features to a first trained machine-learning algorithm and receiving as output from the first trained machine-learning algorithm first item identifiers representing the single items.

In an embodiment of 242 and at 243, the vision-based multiple item identifier identifies a second set of bounding boxes that comprise multiple item features for occluded items that are occluded from view within the image, wherein each occluded item representing a corresponding different set of items.

In an embodiment of 243 and at 244, the vision-based multiple item identifier provides the second set of bounding boxes and the corresponding multiple item features to a second trained machine-learning algorithm and receiving as output from the second trained machine-learning algorithm second item identifiers representing the occluded items.

At 250, the vison-based multiple item identifier provides the item identifiers to a transaction manager during a transaction at a transaction terminal.

At 260, the transaction manager obtains item details and item pricing based on the item identifiers.

In an embodiment of 260 and at 261, the transaction manager obtains payment details from a customer associated with the transaction based on the item pricing.

In an embodiment of 261 and at 262, the transaction manager obtains a payment for the customer from a payment service associated with the payment details and completing the transaction with the customer at the transaction terminal.

Figure 3:
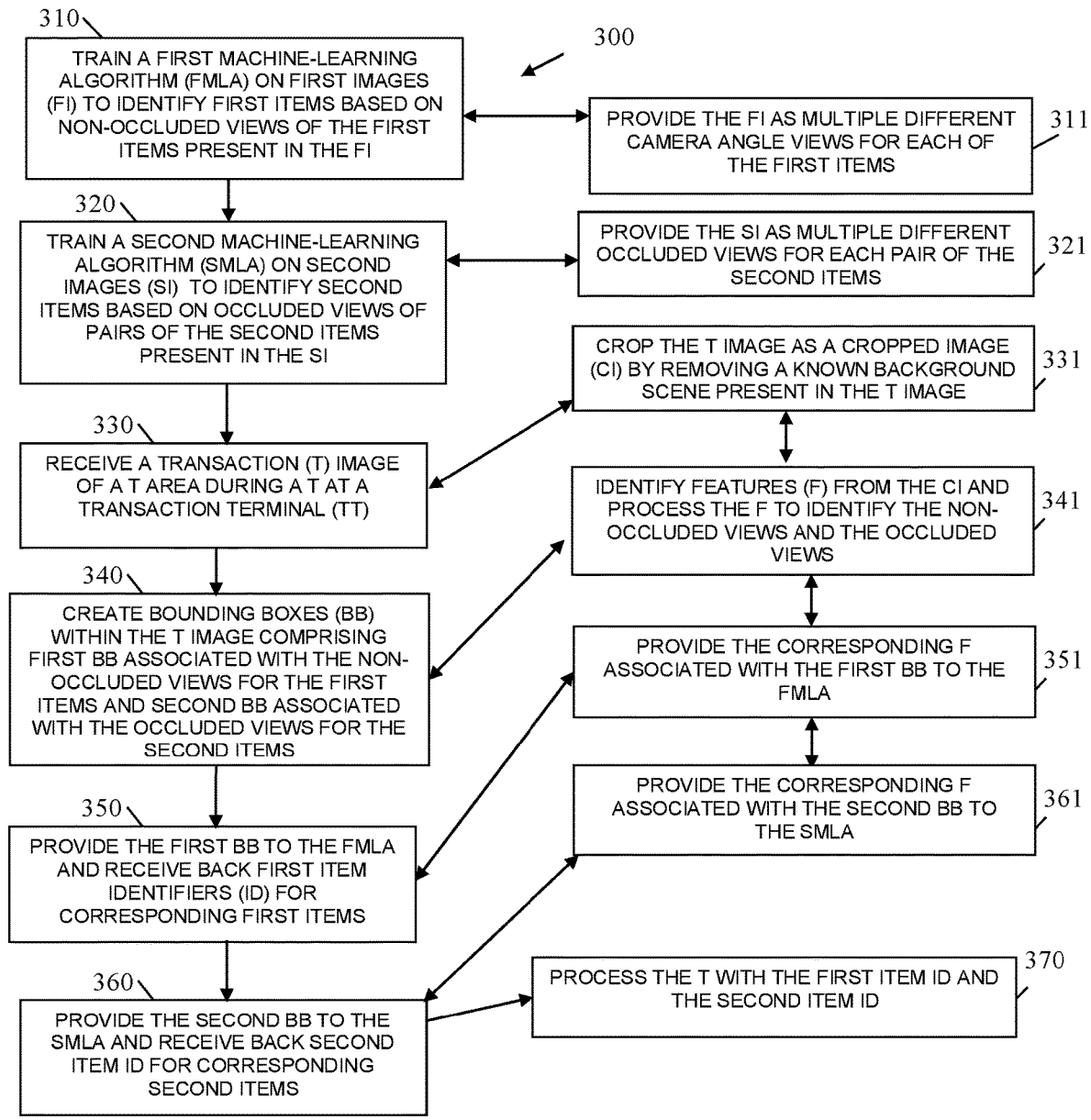
FIG. 3 is a diagram of another method for vison-based detection of multiple items having occluded item views, according to an example embodiment.

FIG. 3 is a diagram of another method 300 for vison-based detection of multiple items having occluded item views according to an example embodiment. The software module(s) that implements the method 300 is referred to as an "occluded item identifier." The occluded item identifier is implemented as executable instructions programmed and residing within memory and/or a non-transitory computer-readable (processor-readable) storage medium and executed by one or more processors of a device. The processors that execute the occluded item identifier r are specifically configured and programmed to process the occluded item identifier. The occluded item identifier has access to one or more network connections during its processing. The network connections can be wired, wireless, or a combination of wired and wireless.

In an embodiment, the device that executes the occluded item identifier is server 120. In an embodiment, the server 120 is one of multiple servers that logically cooperate as a single cloud processing environment (cloud).

In an embodiment, the occluded item identifier is all of or some combination of the trainer 133, MLAs 134, item recognizer 135, transaction manager 136, and/or the method 200.

The occluded item identifier presents another and, in some ways, enhanced processing perspective of the method 200 discussed above.

At 310, the occluded item identifier trains a first machine-learning algorithm on first images to identify first items based on non-occluded views of the first items present in the first images.

In an embodiment, at 311, the occluded item identifier provides the first images as multiple different camera angle views for each of the first items.

At 320, the occluded item identifier trains a second machine-learning algorithm on second image to identify second items based on occluded views of pairs of the second items present in the second images.

In an embodiment, at 321, the occluded item identifier provides the second images as multiple different occluded views for each pair of the second items.

At 330, the occluded item identifier receives a transaction image of a transaction area during a transaction at a transaction terminal.

In an embodiment, at 331, the occluded item identifier crops the transaction image as a cropped image by removing a known background scene present in the transaction image.

At 340, the occluded item identifier creates bounding boxes within the transaction image comprising first bounding boxes associated with the non-occluded views for the first items and second bounding boxes associated with the occluded views for the second items.

In an embodiment, at 341, the occluded item identifier identifies features from the cropped image and processing the features to identify the non-occluded views and the occluded views.

At 350, the occluded item identifier provides the first bounding boxes to the first machine-learning algorithm and receiving back first item identifiers for corresponding first items.

In an embodiment of 341 and 350, at 351, the occluded item identifier provides the corresponding features associated with the first bounding boxes to the first machine-learning algorithm.

At 360, the occluded item identifier provides the second bounding boxes to the second machine-learning algorithm and receiving back second item identifiers for corresponding second items.

In an embodiment of 351 and 360, at 361, the occluded item identifier provides the corresponding features associated with the second bounding boxes to the second machine-learning algorithm.

At 370, the occluded item identifier processes the transaction with the first item identifiers and the second item identifiers.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped in a single embodiment to streamline the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   training a first machine-learning algorithm on first images to identify first items based on non-occluded views of the first items present in the first images;
   training a second machine-learning algorithm on second images to identify second items based on occluded views of pairs of the second items present in the second images;
   receiving a transaction image of a transaction area during a transaction at a transaction terminal;
   creating bounding boxes within the transaction image comprising first bounding boxes associated with the non-occluded views for the first items and second bounding boxes associated with the occluded views for the second items;
   providing the first bounding boxes to the first machine-learning algorithm and receiving back first item identifiers for corresponding first items;
   providing the second bounding boxes to the second machine-learning algorithm and receiving back second item identifiers for corresponding second items; and
   processing the transaction with the first item identifiers and the second item identifiers.

2. The method of claim 1 wherein training the first machine-learning algorithm further includes providing the first images as multiple different camera angle views for each of the first items.

3. The method of claim 1, wherein training the second machine-learning algorithm further includes providing the second images as multiple different occluded views for each pair of the second items.

4. The method of claim 1, wherein receiving further includes cropping the transaction image as a cropped image by removing a known background scene present in the transaction image.

5. The method of claim 4, wherein creating further includes identifying features from the cropped image and processing the features to identify the non-occluded views and the occluded views.

6. The method of claim 5, wherein providing the first bounding boxes further includes providing the corresponding features associated with the first bounding boxes to the first machine-learning algorithm.

7. The method of claim 6, wherein providing the second bounding boxes further includes providing the corresponding features associated with the second bounding boxes to the second machine-learning algorithm.

8. A system, comprising:
   a camera;
   a transaction terminal;
   a server comprising a processor and a non-transitory computer-readable storage medium having executable instructions; and
   the executable instructions when executed by the processor from the non-transitory computer-readable storage medium cause the processor to perform processing comprising:
   obtaining a transaction image of a transaction area of the transaction from the camera;
   cropping the transaction image as a cropped image by removing a known background scene associated with the transaction area;
   extracting features from the cropped image;
   identifying single items from the cropped image based on the features;
   identifying multiple items that overlap and have an occluded view based on the features;
   obtaining first item identifiers for the single items from a first trained-machine learning algorithm;
   obtaining second item identifiers for the multiple items from a second trained-machine learning algorithm; and
   processing the first item identifiers and the second item identifiers to complete a transaction at the transaction terminal.

9. The system of claim 8, wherein the transaction terminal is a Self-Service Terminal (SST).

10. The system of claim 9, wherein the SST is a vision-based SST that performs item recognition for transaction items based on the transaction image by providing the first item identifiers and the second item identifiers.

* * * * *